(12) United States Patent
Kofman et al.

(10) Patent No.: US 11,486,368 B2
(45) Date of Patent: Nov. 1, 2022

(54) TOOL CHAIN AND METHOD FOR CONCENTRIC FIXING AND EXCHANGE OF GEARBOX AND GENERATOR INTERNAL COMPONENTS

(71) Applicant: Vestas Wind Systems A/S, Aarhus N. (DK)

(72) Inventors: Joris Kofman, Aalborg Ø (DK); Niels Møller Madsen, Århus C (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/260,290

(22) PCT Filed: Jul. 17, 2019

(86) PCT No.: PCT/DK2019/050231
§ 371 (c)(1),
(2) Date: Jan. 14, 2021

(87) PCT Pub. No.: WO2020/043250
PCT Pub. Date: Mar. 5, 2020

(65) Prior Publication Data
US 2021/0301793 A1    Sep. 30, 2021

(30) Foreign Application Priority Data
Aug. 31, 2018  (DK) ............................ PA 2018 70561

(51) Int. Cl.
*F03D 80/50*        (2016.01)
(52) U.S. Cl.
CPC .......... *F03D 80/50* (2016.05); *F05B 2230/70* (2013.01)

(58) Field of Classification Search
CPC .. F03D 80/50; F05B 2230/70; F05B 2230/80; B23P 19/04
See application file for complete search history.

(56) References Cited

U.S. PATENT DOCUMENTS

| 4,443,922 A | 4/1984 | Deland |
| 5,165,156 A | 11/1992 | Shultz |

(Continued)

FOREIGN PATENT DOCUMENTS

| CN | 102528741 B | 2/2015 |
| CN | 205734695 U | 11/2016 |

OTHER PUBLICATIONS

Danish Patent and Trademark Office, Search and Examination Report in PA 2018 70561, dated Feb. 12, 2019.

(Continued)

*Primary Examiner* — Christopher J Besler
(74) *Attorney, Agent, or Firm* — Wood Herron & Evans LLP

(57) ABSTRACT

A tool chain (10) is provided for performing a method of removing internal components such as a bearing cassette (64) from the interior of a generator (12) and/or a gearbox (14) of a wind turbine. The tool chain (10) includes a tube (30) that extends through the interior of the generator (12), at least one clamp element (36) that concentrically fixes the tool chain (10) in position on at least one output shaft (60, 62) of the gearbox (14), and a sliding tool (50) that moves along the tube (30) into and out of the generator to couple with and pull out internal components to be repaired or replaced. For example, the tool chain (10) can remove the bearing cassette (64) located adjacent the junction of the gearbox (14) and the generator (12) without necessitating disassembly of the gearbox (14) from the generator (12).

22 Claims, 17 Drawing Sheets

(56) References Cited

U.S. PATENT DOCUMENTS

2007/0236018 A1* 10/2007 Husmann ............ F16L 37/2445
  285/401
2010/0275442 A1   11/2010 Ohl, Jr.
2013/0315714 A1   11/2013 Muller

OTHER PUBLICATIONS

European Patent Office, International Search Report and Written Opinion in PCT Application No. PCT/DK2019/050231, dated Oct. 14, 2019.

* cited by examiner

TOOL CHAIN AND METHOD FOR CONCENTRIC FIXING AND EXCHANGE OF GEARBOX AND GENERATOR INTERNAL COMPONENTS

TECHNICAL FIELD

The invention relates generally to wind turbines, and more particularly to a tool chain that selectively engages with components of a gearbox and generator of a wind turbine such that internal components of the gearbox and generator can be removed and replaced while fixing components of these elements in position, and a method of replacing such components of the wind turbine in an improved manner.

BACKGROUND

Wind turbines are used to produce electrical energy using a renewable resource and without combusting a fossil fuel. Generally, a wind turbine converts kinetic energy from the wind into electrical power. A conventional wind turbine installation includes a foundation, a tower supported by the foundation, and an energy generating unit positioned atop of the tower. The energy generating unit typically includes one or more nacelles to house several mechanical and electrical components, such as a generator, gearbox, and main bearing, and the wind turbine also includes a rotor operatively coupled to the components in the nacelle through a main shaft extending from the nacelle. Single rotor wind turbines and multi-rotor wind turbines (which may have multiple nacelles) are known, but for the sake of efficiency, the following description refers primarily to single rotor designs. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with many wind turbine installations being located both on land and offshore.

As noted above, the nacelle houses several wind turbine components which operate at the top end of the tower to convert kinetic energy from the wind and the rotor blades into electrical energy. Many of these components rotate at varying speeds during use, and as such, over time the components may reach the end of useful life and thereby require replacement. Because the components within the nacelle are separated from the ground by the tall tower, the process and logistics of removing and replacing components of the generator, gearbox, and the like are complex. Moreover, there is often not much excess space within the nacelle, adding to the difficulty of working on or replacing such components of the energy generating unit. In many conventional systems and methods, the entire generator must be removed from the nacelle and moved by a large external crane whenever repairs or replacement of one or more internal components becomes necessary. It would be desirable to avoid the need for renting and using such external cranes.

Accordingly, wind turbine manufacturers, installers and operators are seeking improved options for conducting maintenance and repair on components located within the nacelle and within the energy generating unit of modern wind turbine designs.

SUMMARY

To these and other ends, aspects of the invention are directed to a tool chain for concentric fixing and exchange of internal gearbox and generator components of a wind turbine. The tool chain can advantageously remove internal components of the gearbox and generator such as a bearing cassette without necessitating full disconnection of the generator from the gearbox of the wind turbine. As such, the nacelle's onboard crane can be used to move the internal components down tower for repair or replacement rather than requiring use of a large external crane to complete regular maintenance or repairs of the energy generating unit components. The tool chain and the associated method of use provides several technical effects and advantages described in further detail below.

In an exemplary embodiment, a tool chain is configured to remove internal components from a generator and from a gearbox of a wind turbine. The tool chain includes a tube having a distal tube portion and a proximal tube portion removably coupled to one another. The tube defines a longitudinal length configured to extend through the generator so as to terminate in or outside the gearbox. The tool chain also includes at least one clamp element located on the distal tube portion and operable to fix the distal tube portion in position relative to internal components of the generator or the gearbox of the wind turbine. The tool chain further includes a sliding tool that translates along the tube between the proximal tube portion and the at least one clamp element. The sliding tool is configured to be removably secured to internal components to move the internal components along the tube and out of the generator and the gearbox.

In an exemplary embodiment, the tool chain also includes an end support that receives and supports a portion of the proximal tube portion, and the end support is configured for mounting within a nacelle of the wind turbine and outside the generator. The proximal tube portion is moveable relative to the end support when disconnected from the distal tube portion, to open a gap between the generator and the proximal tube portion. The gap provides clearance for removal of internal components secured to the sliding tool from the wind turbine.

In an exemplary embodiment, the tool chain also includes a support arm coupled to the generator and configured to be removably coupled to the distal tube portion adjacent the removable coupling of the distal and proximal tube portions. The support arm supports the distal tube portion when it is disconnected from the proximal tube portion and the end support. To this end, the support arm includes a hook at one end and a swivel joint at an opposite end, with the hook being removably coupled to the distal tube portion. The swivel joint is coupled to the generator to enable pivotal movement of the support arm and the hook towards and away from the distal tube portion. The hook is configured to resist torque forces applied when connecting or disconnecting the distal and proximal tube portions. For example, the distal and proximal tube portions may include conical threads for removably coupling these elements to one another, and the hook resists the torque applied in making this threaded connection.

In an exemplary embodiment, the gearbox of the wind turbine includes first and second output shafts for transmitting rotational energy to the generator. In such an embodiment, the at least one clamp element includes a plurality of clamp elements, at least one of which engages the first output shaft and at least one of which engages the second output shaft when the plurality of clamp elements fixes the distal tube portion in position relative to the first and second output shafts. Each of the clamp elements is a concentric expanding clamp element that actuates by expanding radially outwardly into locked, frictional engagement with the first and second output shafts. The second output shaft may be removably connected to a bearing cassette positioned adjacent a connection of the gearbox to the generator, and the plurality of clamp elements maintains the concentric fixing of the first and second output shafts in position when the sliding tool of the tool chain is used to remove the bearing cassette from the generator.

In an exemplary embodiment, the end support of the tool chain includes a tube receptacle that receives a portion of the proximal tube portion therethrough and a frame element configured to enable limited pivotal movement of the tube receptacle and the proximal tube portion when the proximal tube portion is disconnected from the distal tube portion. The limited pivotal movement facilitates removal of the removed internal component of the generator or gearbox from the tool chain and from the nacelle of the wind turbine. The sliding tool is a cylindrical flange element including apertures configured to receive bolt fasteners for removable connection to internal components that are to be removed using the tool chain.

In another embodiment, a method of disassembling and removing internal components from a generator or a gearbox of a wind turbine for repair or replacement includes inserting a tool chain through an interior of the generator so as to terminate in or outside the gearbox. The insertion of the tool chain is such that a tube of the tool chain extends from a distal tube portion, which is located within a first output shaft of the gearbox that transmits rotational energy from the gearbox to the generator, to a proximal tube portion that is configured to extend outside the generator. The method also includes actuating at least one clamp element located on the distal tube portion to fix the tool chain in position relative to the first output shaft of the gearbox. A sliding tool of the tool chain is moved along the length of the tube from a position on the proximal tube portion into the interior of the generator, where the sliding tool is coupled to an internal component of the generator or the gearbox. The sliding tool is then moved along with the internal component along the tube onto the proximal tube portion, and out of the interior of the generator.

In an exemplary embodiment, the proximal tube portion extends through an end support located outside the generator and gearbox, and the method further includes disconnecting and separating the distal tube portion from the proximal tube portion to open a gap between the generator and the proximal tube portion. The gap provides clearance for removal of the internal component of the generator or the gearbox from the tool chain and from the wind turbine, such as by using the nacelle's onboard crane.

In an exemplary embodiment, the method also includes uncoupling the sliding tool and the internal component such that the internal component can be removed from the tool chain. The distal tube portion and proximal tube portion are then reconnected to reassemble the tool chain and prepare the tool chain for removal of additional internal components of the generator and the gearbox. For example, many of the method steps above can be repeated to remove additional internal components that require repair or replacement, and this can include a bearing cassette associated with the gearbox. The steps and elements described herein can be reconfigured and combined in different combinations to achieve the desired technical effects in different styles of wind turbines, as may be needed in the art.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
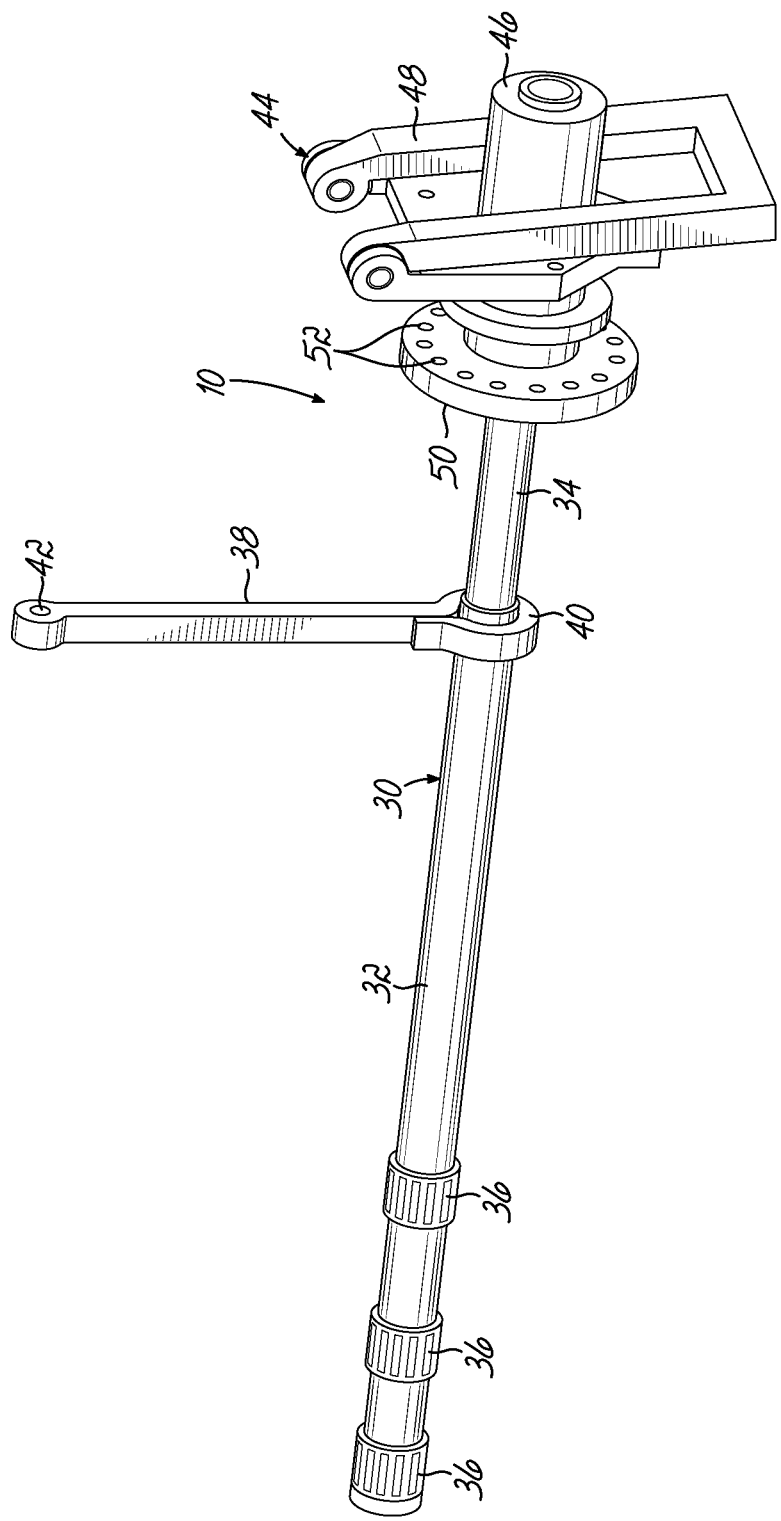
FIG. 1 is a diagrammatic perspective view of a tool chain in accordance with one embodiment of the invention, the tool chain fully assembled.

With reference to FIGS. 1 through 17 and in accordance with an embodiment of the invention, a tool chain 10 is provided along with a method for concentric fixing and for exchange of internal generator and gearbox components of a wind turbine. The tool chain 10 advantageously allows for disassembly of several internal components of elements of an energy generating unit contained within the nacelle of a wind turbine. Those internal components can be moved by the nacelle's internal crane to the bottom of the wind turbine's tower and then replaced with a new or repaired component. As a result, the entire generator and gearbox assembly does not need to be removed from the nacelle for conducting this type of maintenance, and large external cranes are not necessary for such maintenance. These and other advantages of the tool chain 10 and the associated method(s) will be described in further detail with reference to the drawing views below.

As understood in the art, the wind turbine (at which the tool chain 10 functions) includes the tower, the nacelle disposed at the apex of the tower, and a rotor operatively coupled to a generator 12 housed inside the nacelle. In addition to the generator 12, the nacelle houses miscellaneous components required for converting wind energy into electrical energy and various components needed to operate, control, and optimize the performance of the wind turbine, including a gearbox 14 adjacent the generator 12. To this end, the generator 12 and gearbox 14 define part of the energy generating unit for the wind turbine. The tower supports the load presented by the nacelle, the rotor, and other components of the wind turbine that are housed inside the nacelle and operates to elevate the nacelle and rotor to a height above ground level or sea level, as may be the case. Although a single rotor and nacelle are described in this example, it will be understood that the tool chain 10 may also be used with wind turbines that include multi rotor designs in other embodiments.

Now turning with further reference to FIG. 1, one embodiment of the tool chain 10 is shown in a fully-assembled state. The tool chain 10 includes a tube 30 that extends along a longitudinal length configured to extend within components of the energy generating unit of the wind turbine when in use as described below. The tube 30 is defined in this embodiment by a distal tube portion 32 and a proximal tube portion 34 that are removably coupled to one another by a conical thread. Although each of the distal and proximal tube portions 32, 34 is shown as a single member or piece in this embodiment, it will be understood that one or both of these tube portions may be subdivided into multiple subsections in other embodiments without departing from the scope of this invention, and conical threads would likely still be used to connect these subsections in such an embodiment. The conical thread engagement provides sufficient stiffness and bending resistance to the joint between the portions, which is beneficial because large heavy components will be moved along the length of the tube 30 when the tool chain 10 is in use. The distal tube portion 32 includes three concentric expanding clamp elements 36 configured to selectively engage with one or more output shafts in the wind turbine. The clamp elements 36 are positioned generally at an opposite end of the distal tube portion 32 from its connection to the proximal tube portion 34. The tool chain 10 also includes a support arm 38 including a hook 40 that can engage with the end of the distal tube portion 32 located adjacent to the connection with the proximal tube portion 34. The support arm 38 projects radially outwardly from the tube 30 when the hook 40 is engaged with the distal tube portion 32. An opposite end of the support arm 38 includes a swivel joint 42 configured to be engaged with the housing of the generator 12, in one example. The distal tube portion 32 is configured to locate the tool chain 10 in position to remove internal components of the energy generating unit, and the support arm 38 is configured to provide sufficient support for the tube 30 and the output shaft(s) when the remainder of the tool chain 10 is disconnected, as will be described further.

The proximal tube portion 34 of the tool chain 10 extends from the connection with the distal tube portion 32 to an end support 44 located on an opposite end of the longitudinal length from the clamp elements 36. The end support 44 includes a tube receptacle 46 that slidingly receives a portion of the proximal tube portion 34 therethrough and a frame element 48 configured to be bolted or otherwise secured to the framework of the nacelle to support the tool chain 10 along this end. The tool chain 10 also includes a sliding tool 50 shown located adjacent to the end support 44 in the initial position shown in FIG. 1. It will be appreciated that the end support 44 may be omitted in other embodiments of the invention where the tube 30 defines sufficient yield strength and rigidity to support the sliding tool 50 in a cantilevered position extending from engagement at the clamp elements 36. The sliding tool 50 of this embodiment takes the form of a cylindrical flange-like element with various apertures 52 configured to enable bolted connections of the sliding tool 50 to components to be removed or replaced within the energy generating unit of the wind turbine. The sliding tool 50 is sized to translate along the length of the tube 30. Each of the components of the tool chain 10 in this embodiment are formed from a steel material, but other structural materials can be used without departing from the scope of the invention. It will be understood that this arrangement of elements of the tool chain 10 is but one embodiment according to the invention, which may be modified based on changes in the design of the wind turbine components it is to disassemble, and the use of such an embodiment will now be described in further detail.

Figure 2:
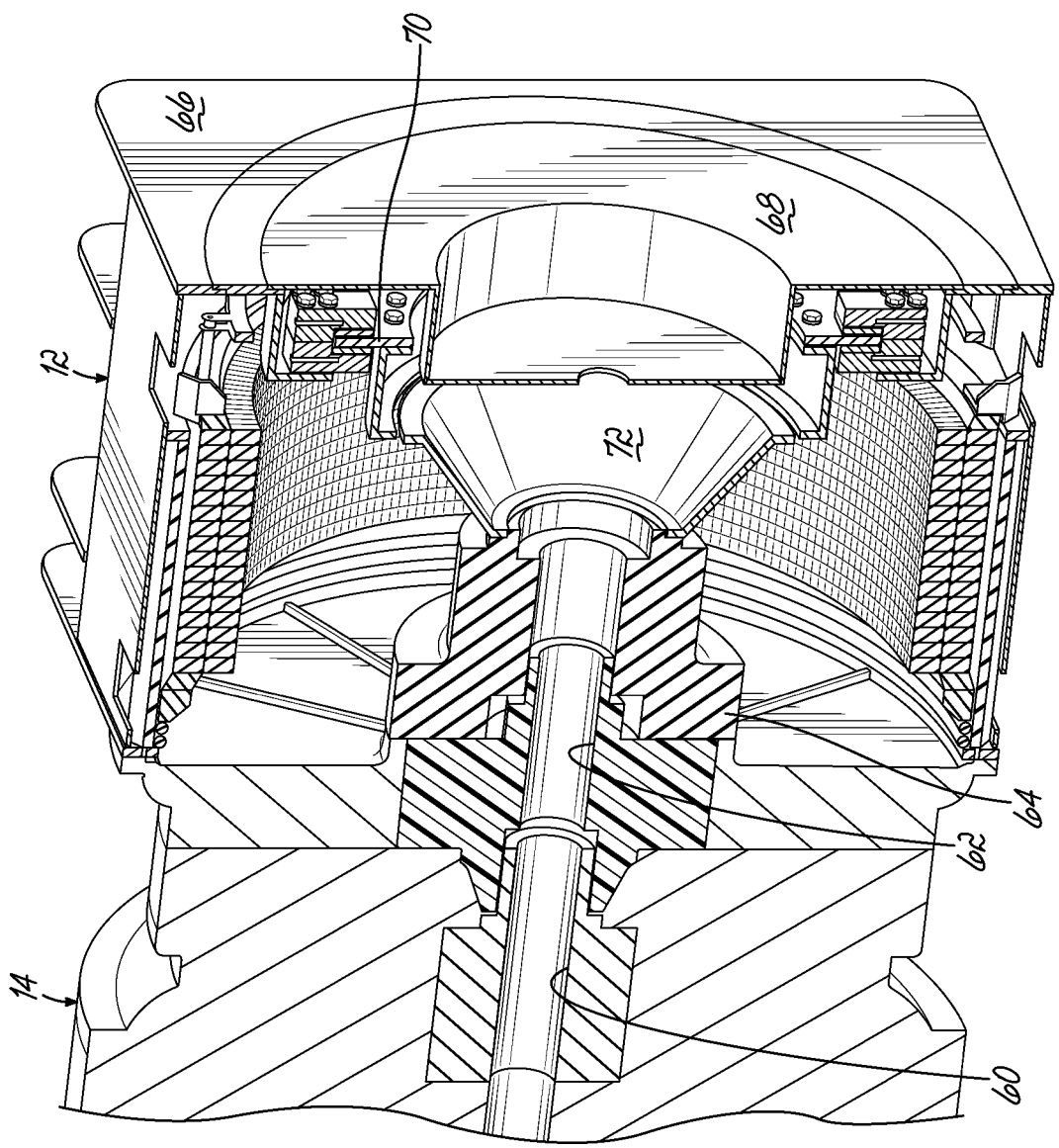
FIG. 2 is a perspective partially cross-sectioned view of an energy generating unit of a wind turbine, including a gearbox and a generator shown in a first configuration before disassembly of some internal components with the tool chain of FIG. 1.

Turning to FIG. 2, an energy generating unit of a wind turbine is shown in partial cross section, before a process for removing and replacing internal components is started. The energy generating unit includes the generator 12 and the gearbox 14, which receive rotational input from the rotor and blades as set forth above. The internal components of the generator 12 are shown in further detail, while the gearbox 14 is mostly shown in "black box" cross section. In this wind turbine, the gearbox 14 includes a first output shaft 60 and a second output shaft 62, the first of which defines a central pinion of a planetary gear assembly in the gearbox 14 and the second of which defines a planetary gear in a similar/adjacent assembly (e.g., the output shafts 60, 62 are part of two different stages in the gearbox 14). Thus, it will be appreciated that the second output shaft 62 is not designed to support itself when disengaged from other components of the energy generating unit. The tool chain 10 of the present invention is configured to address this issue when conducting the process for removing and replacing internal components.

The second output shaft 62 removably engages a bearing cassette 64 located at the junction between the gearbox 14 and the generator 12 as shown in FIG. 2. The second output shaft 62 and the bearing cassette 64 define where rotational speeds (increased by the gearbox 14) are greatest within the wind turbine, to harvest the greatest amount of electrical energy from the input rotation from the ambient wind. Accordingly, the bearing cassette 64 is often one of the first components in the energy generating unit to reach a fatigue limit and need repair or replacement. However, the positioning of the bearing cassette 64 adjacent the interface between the gearbox 14 and the generator 12 renders the bearing cassette 64 difficult to remove without disconnecting the entire generator 12 from the entire gearbox 14, as is typically done according to conventional methods and systems. The tool chain 10 described above advantageously allows for disassembly of several of the internal components of the generator 12 and/or the gearbox 14 to access the bearing cassette 64 without complete disassembly of the energy generating unit.

With continued reference to FIG. 2, several internal components of the generator 12 are shown in further detail. The generator 12 includes a main housing 66 having an end cap 68 configured to close off access to the interior components during normal operation. A central portion of the end cap 68 may project inwardly and sit within a brake disc 70 of the generator 12. The brake disc 70 interacts with the rotor components of the generator 12, which are operatively coupled to the second output shaft 62 using a drive flange 72. The drive flange 72 is generally conical in shape in the illustrated embodiment. On an opposite side of the drive flange 72 from the brake disc 70 is the bearing cassette 64. Thus, to access the bearing cassette 64, one or more of these other internal components (brake disc 70, drive flange 72, etc.) must be removed before the bearing cassette 64. One example of such a process is now described with reference to FIGS. 3 through 17.

Figure 3:
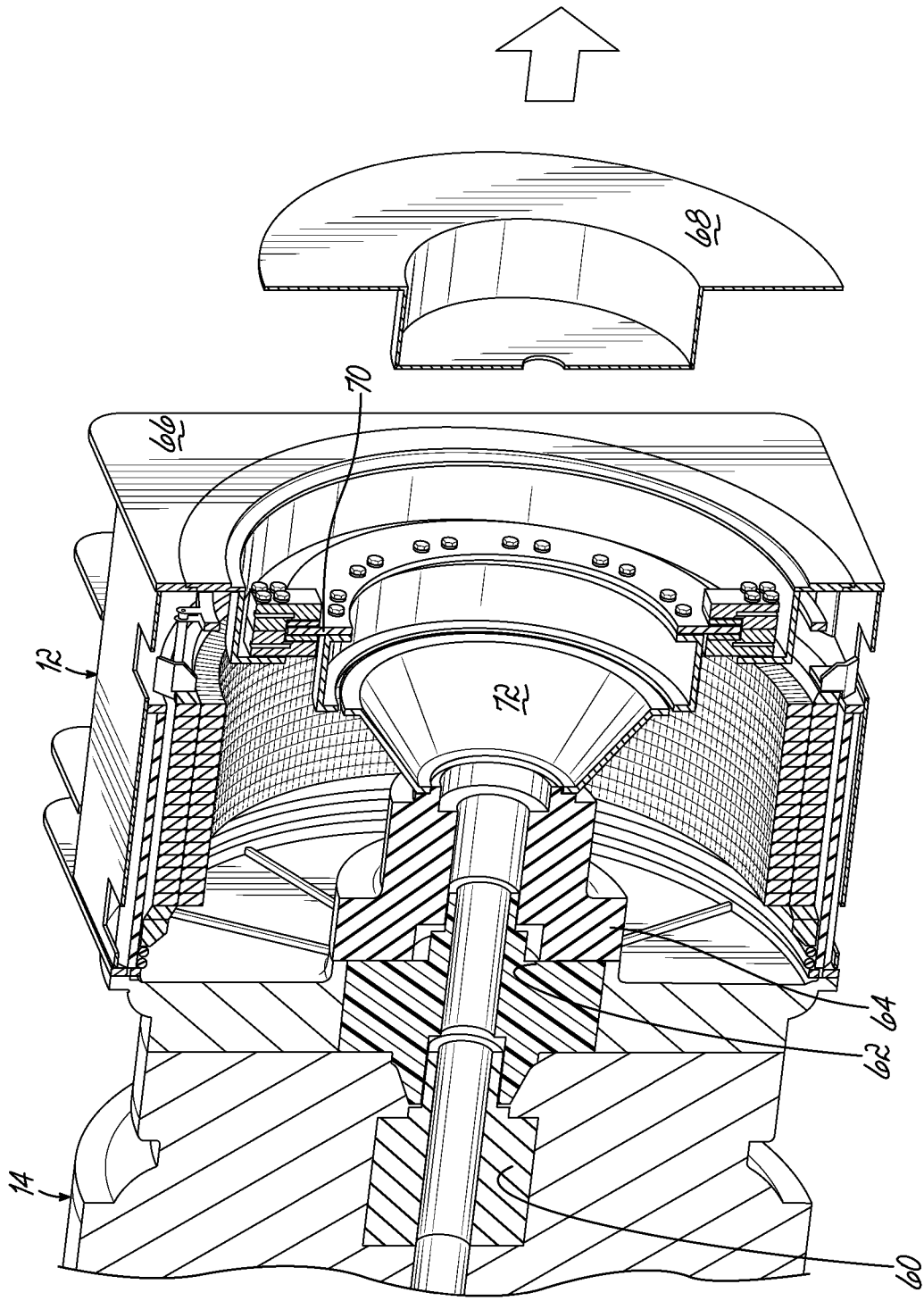
FIG. 3 is a perspective view of the energy generating unit of FIG. 2, with an end cap from the generator being removed in one step of a disassembly process according to one embodiment of the invention.

In FIG. 3, the process for exchanging internal components of the energy generating unit of the wind turbine includes removal of the end cap 68 from the main housing 66 of the generator 12, as shown by the arrow in this Figure. The end cap 68 may be moved to a different portion of the nacelle for temporary storage, or if room within the nacelle does not permit such storage, the nacelle's onboard crane can lower this component to the bottom of the tower. The removal of the end cap 68 reveals the drive components of the generator 12, including the brake disc 70, the drive flange 72, and the rotor components (not numbered) extending between these elements. With the end cap 68 removed, the generator 12 is now ready for installation and use of the tool chain 10.

Figure 4:
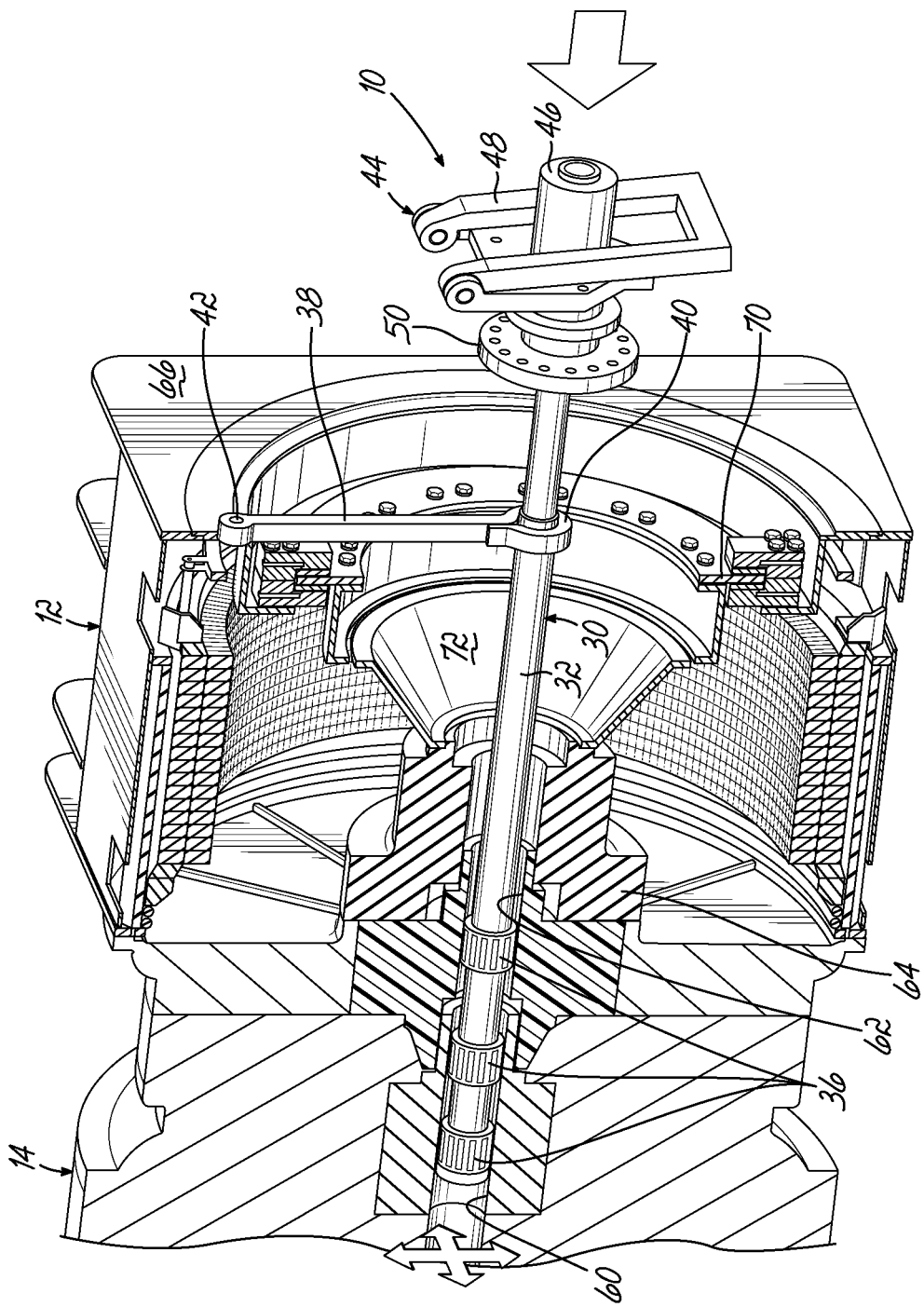
FIG. 4 is a perspective view of the energy generating unit of FIG. 3, with the tool chain of FIG. 1 moved into engagement with first and second output shafts of the gearbox and generator in a further step of the disassembly process.

In this regard, the tool chain 10 is then inserted into the interior of the generator 12 as shown in FIG. 4. The tool chain 10 is in fully assembled form, so the tube 30 extends from the end support 44 outside the generator 12 to a location within the first and second output shafts 60, 62 (each within the gearbox 14) when the tool chain 10 is inserted in the direction of the arrow on the right side of FIG. 4. In this position, two of the concentric expanding clamp elements 36 are positioned within the first output shaft 60, while the third of the concentric expanding clamp elements 36 is located within the second output shaft 62. These clamp elements 36 are actuated to expand outwardly into locked frictional engagement with the first and second output shafts 60, 62 as indicated by the four-headed arrow in FIG. 4. In one example, the clamp elements 36 are actuated to function like a collet for a lathe, but other mechanisms and actuation systems for expanding these elements concentrically can also be provided in other embodiments. The tube 30 and the tool chain 10 are therefore fixed in position relative to the gearbox 14 and the generator 12, which also fixes the second output shaft 62 in position to support it during the further steps of the process. The clamp elements 36 are advantageously configured to handle and transmit the bending forces applied by the internal components within the generator 12 to support and hold the second output shaft 62 in position.

Also shown in FIG. 4, the support arm 38 of the tool chain 10 is connected at the swivel joint 42 to the main housing 66 of the generator 12. The hook 40 of the support arm 38 is engaged with the distal tube portion 32 in this position. The end support 44 is typically mounted on the nacelle for support of the remainder of the tool chain 10, thereby providing support or connections on both ends of the longitudinal length thereof. After the tool chain 10 has been inserted and installed as shown, the process for removing and replacing internal components of the energy generating unit can continue.

Figure 5:
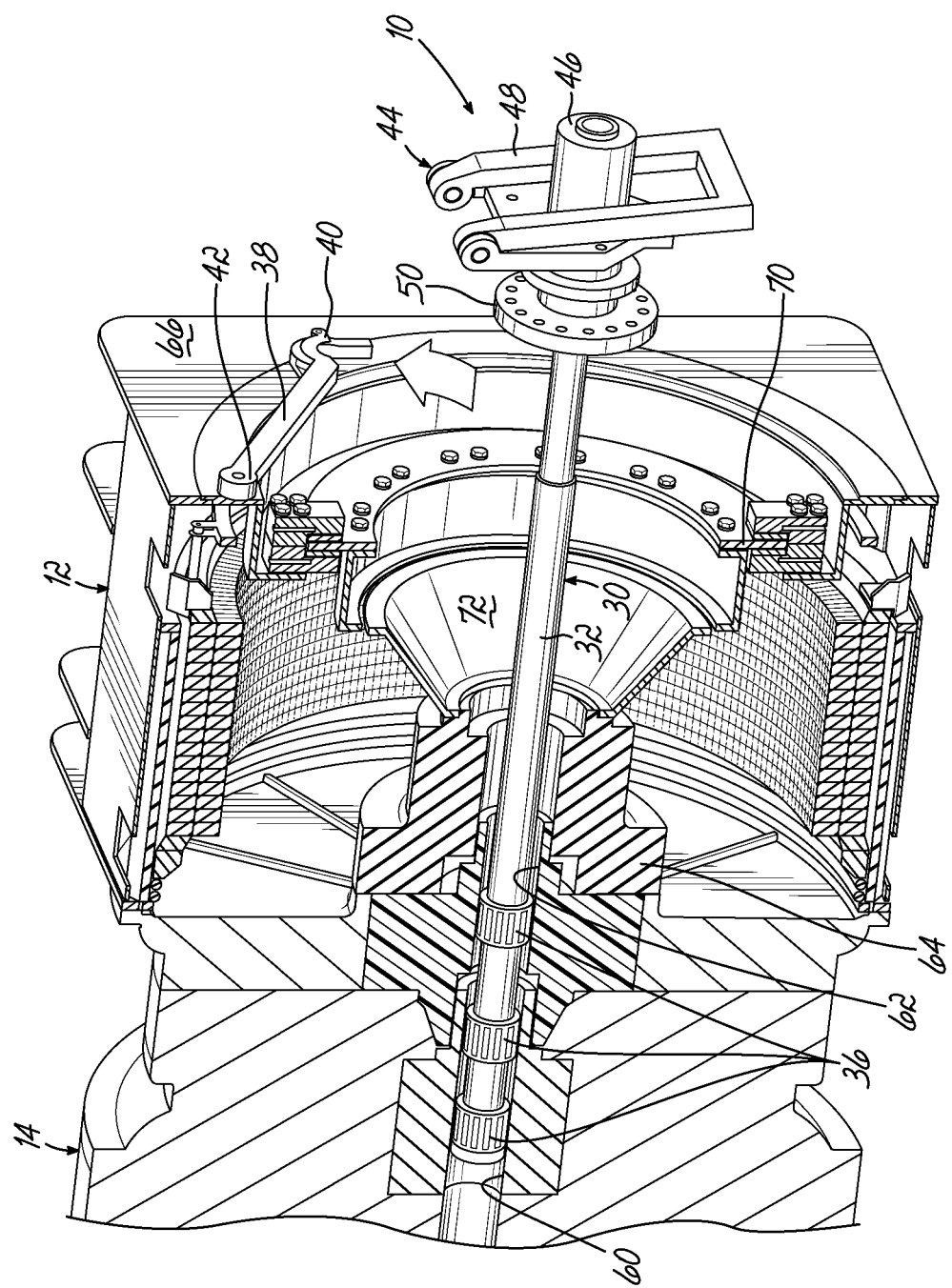
FIG. 5 is a perspective view of the energy generating unit of FIG. 4, with a support arm of the tool chain unhooked from a distal tube portion and pivoted away from the tube of the tool chain, in a further step of the disassembly process.

Continuing to FIG. 5, the support arm 38 is then disconnected from the tube 30 and pivoted away from the tube 30 at the swivel joint 42 as shown by the arrow in this Figure. To this end, the hook 40 includes a release mechanism that quickly moves the hook 40 between a locked position engaged with the distal tube portion 32 and an unlocked or open position. The support arm 38 or hook 40 can be temporarily engaged with the main housing 66 of the generator 12 to retain the support arm 38 in the position shown in FIG. 5 during the following steps of the process of the invention. As set forth above, the first and second output shafts 60, 62 are supported in position by the clamp elements 36 on the tube 30 of tool chain 10, and the tube 30 is now generally unimpeded along its length so that the sliding tool 50 can move into the generator 12.

Figure 6:
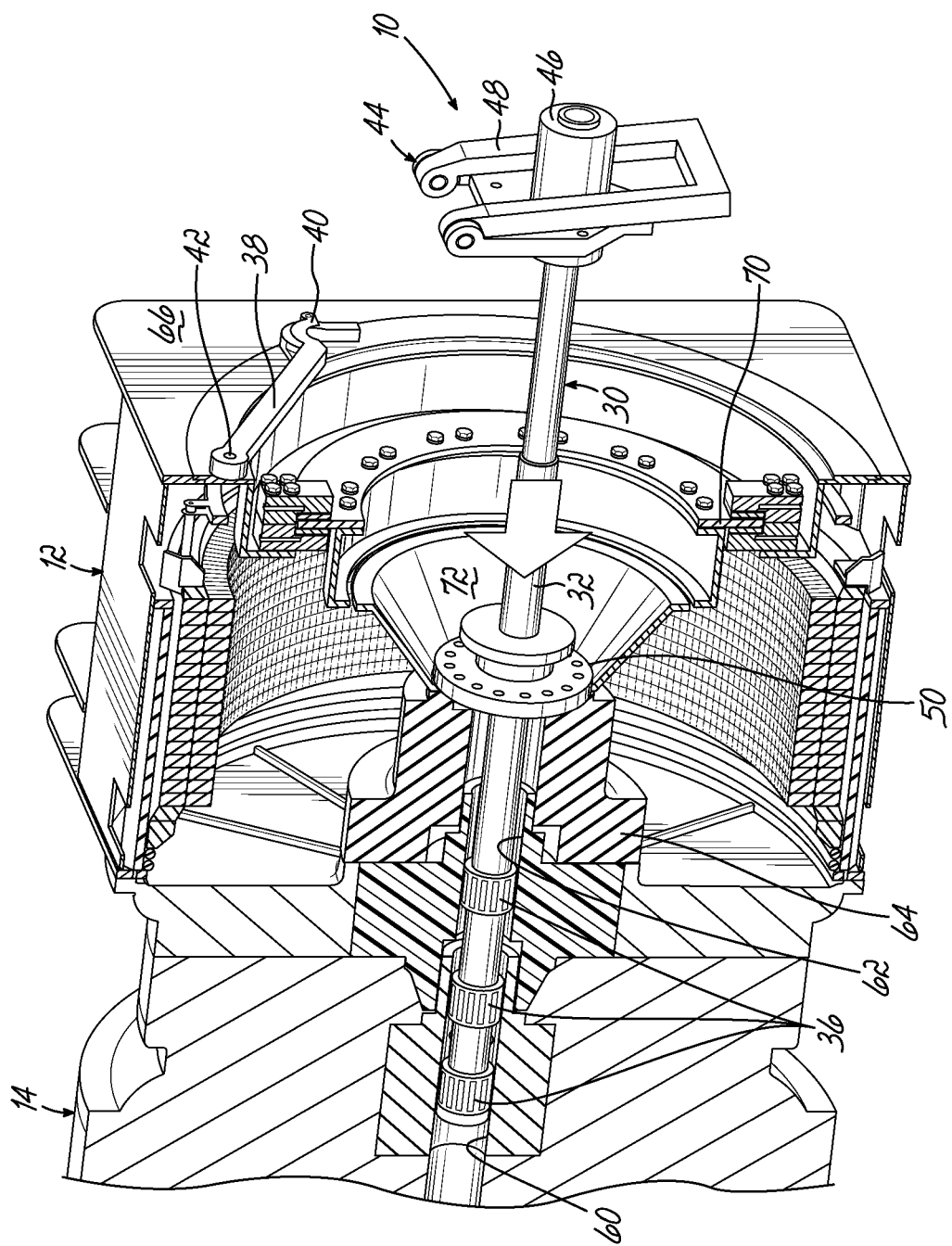
FIG. 6 is a perspective view of the energy generating unit of FIG. 5, with a sliding tool of the tool chain moved along the tube into connection with a drive flange, in a further step of the disassembly process.

Such movement of the sliding tool 50 is shown by the arrow in FIG. 6. In this regard, the sliding tool 50 translates or slides along the tube 30 from the end support 44 to a first internal component to be secured and removed from the generator 12, which in the illustrated example is the drive flange 72 that communicates rotational energy between the second output shaft 62 and a mating flange or similar rotor components of the generator 12. For example, a plurality of bolts or other fasteners are coupled to the drive flange 72 and the apertures 52 of the sliding tool 50 to connect these elements together. If necessary, the drive flange 72 may also be disconnected from the other internal components in the generator 12 it normally interacts with, and the sliding tool 50 is then ready for removal of the drive flange 72.

Figure 7:
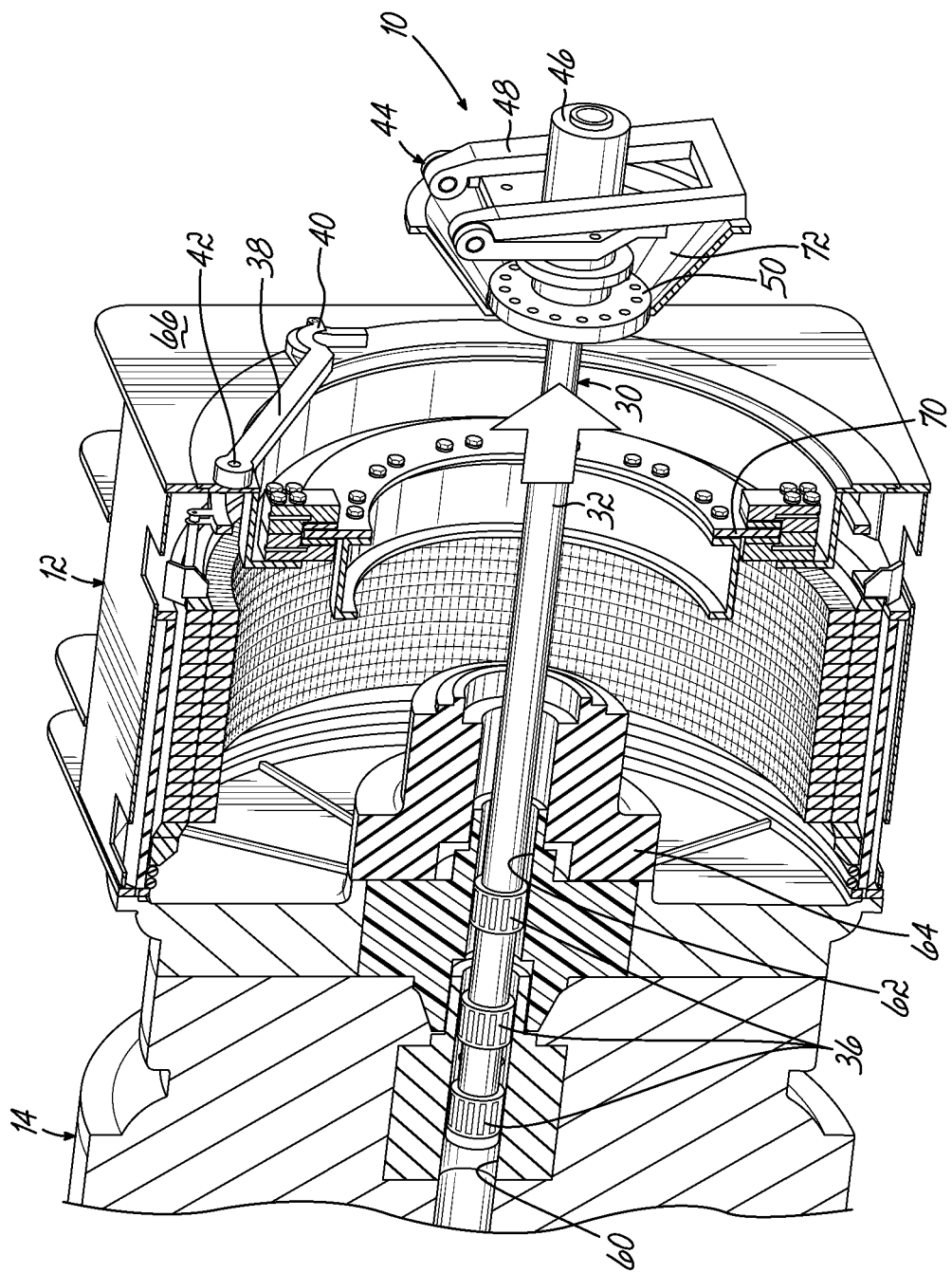
FIG. 7 is a perspective view of the energy generating unit of FIG. 6, with the sliding tool and the drive flange pulled away from the generator and next to an end support of the tool chain, in a further step of the disassembly process.

The drive flange 72 is then moved by sliding movement of the sliding tool 50 along the tube 30 out of the generator 12 and towards the end support 44 as shown by the movement arrow in FIG. 7. In this example, it is shown that the drive flange 72 (and later the bearing cassette 64) are sized small enough to move through the rotor components and the brake disc 70 of the generator 12. However, in alternative designs of the generator 12, these or other elements may block such removal of the internal components described herein, and the sliding tool 50 can also be configured to remove these additional components in those designs without departing from the scope of the invention. The goal in this example embodiment remains to remove a minimum number of internal components of the energy generating unit with the tool chain 10 to access and replace the bearing cassette 64. In the position shown in FIG. 7, the drive flange 72 is ready for transport by the nacelle's onboard crane to a storage location and/or to the bottom of the tower during further steps of the process.

Figure 8:
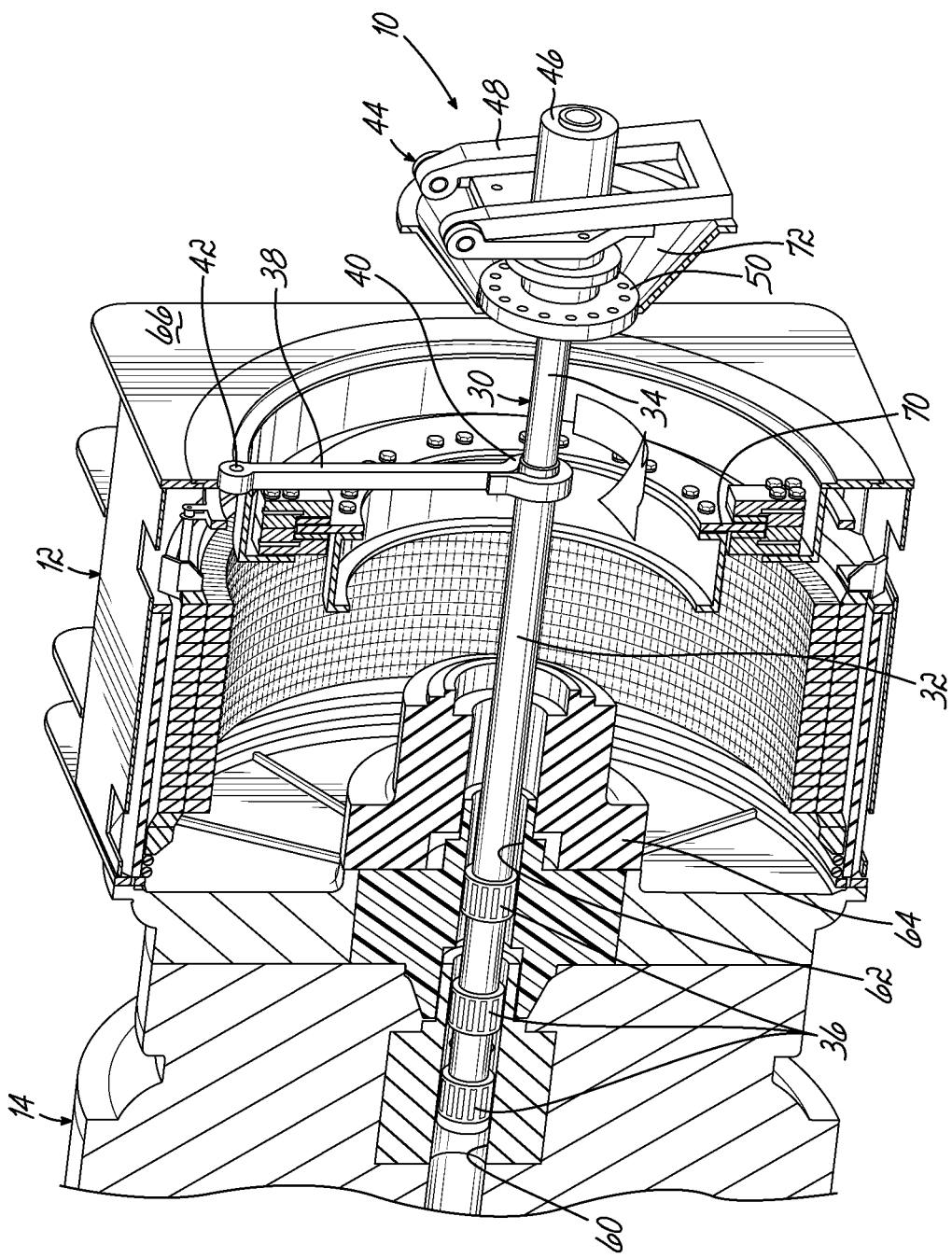
FIG. 8 is a perspective view of the energy generating unit of FIG. 7, with the support arm of the tool chain pivoted back into engagement with the distal tube portion to support the tube, in a further step of the disassembly process.

Next, as shown in FIG. 8, the support arm 38 is pivoted back along the arrow in this Figure such that the hook 40 is brought into locked engagement with the tube 30 at the distal tube portion 32. The hook 40 is specifically configured to hold the distal tube portion 32 against torque applied when the proximal tube portion 34 is rotated to disengage the conical threaded engagement between these portions. Once the support arm 38 is in the position of FIG. 8, the process continues by disengaging the proximal tube portion 34 from the distal tube portion 32 such that the proximal tube portion 34 can be withdrawn through the tube receptacle 46.

Figure 9:
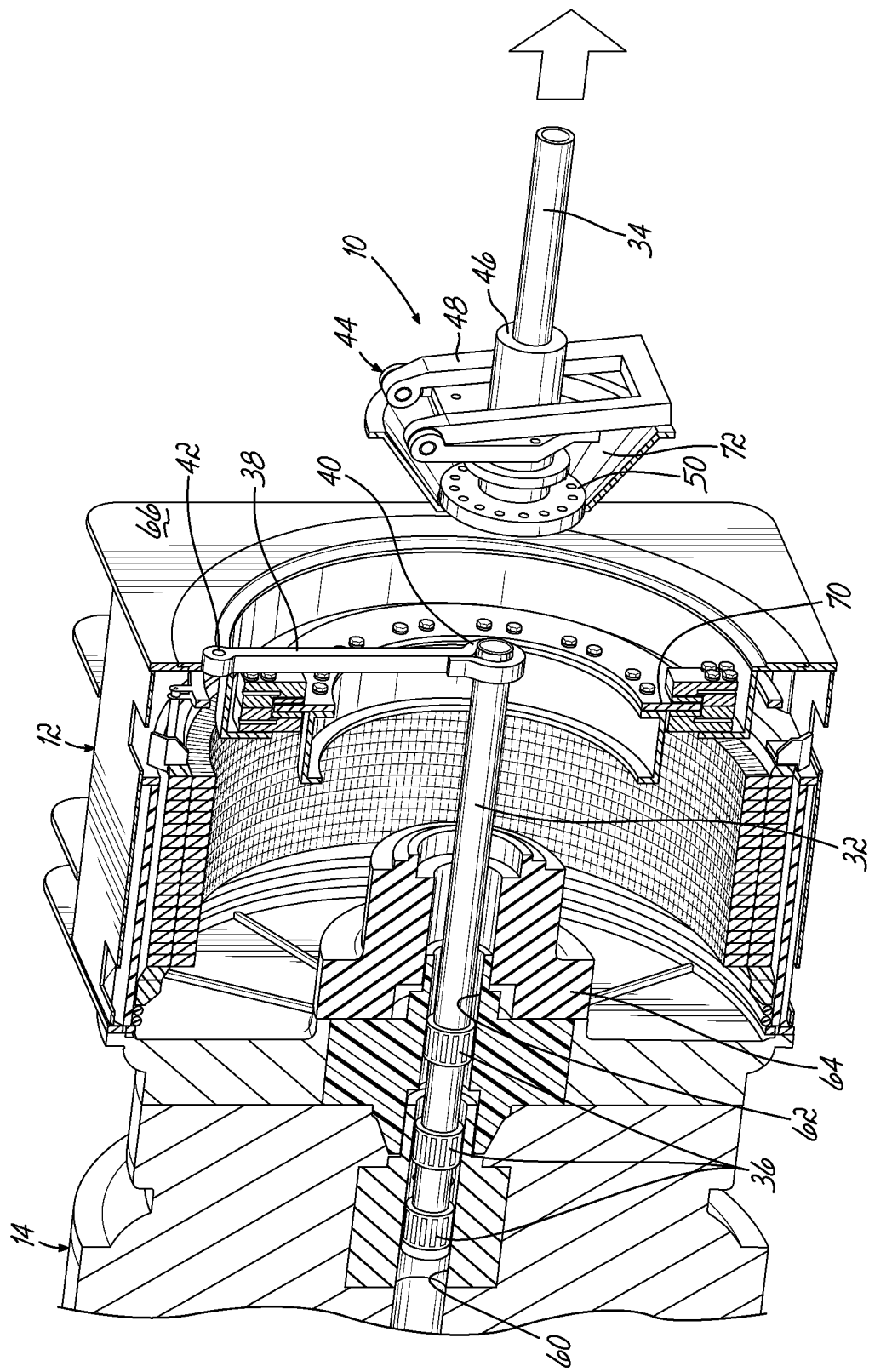
FIG. 9 is a perspective view of the energy generating unit of FIG. 8, with a proximal tube portion of the tool chain disconnected from the distal tube portion and moved through the end support to open a gap for release of the drive flange, in a further step of the disassembly process.

The movement or withdrawal of the proximal tube portion 34 through the tube receptacle 46 is shown by the arrow in FIG. 9. As can be seen in this Figure, the hook 40 and support arm 38 now provide the support of the second output shaft 62 on an opposite end from where the expanding clamp elements 36 engage the first and second output shafts 60, 62. The movement of the proximal tube portion 34 opens a gap between the sliding tool 50 on the tool chain 10 and the generator 12, this gap being sufficiently sized to allow for movement and removal of the drive flange 72. Consequently, the nacelle's crane is secured to the drive flange 72 in this position if that engagement had not been affected earlier in the process.

Figure 10:
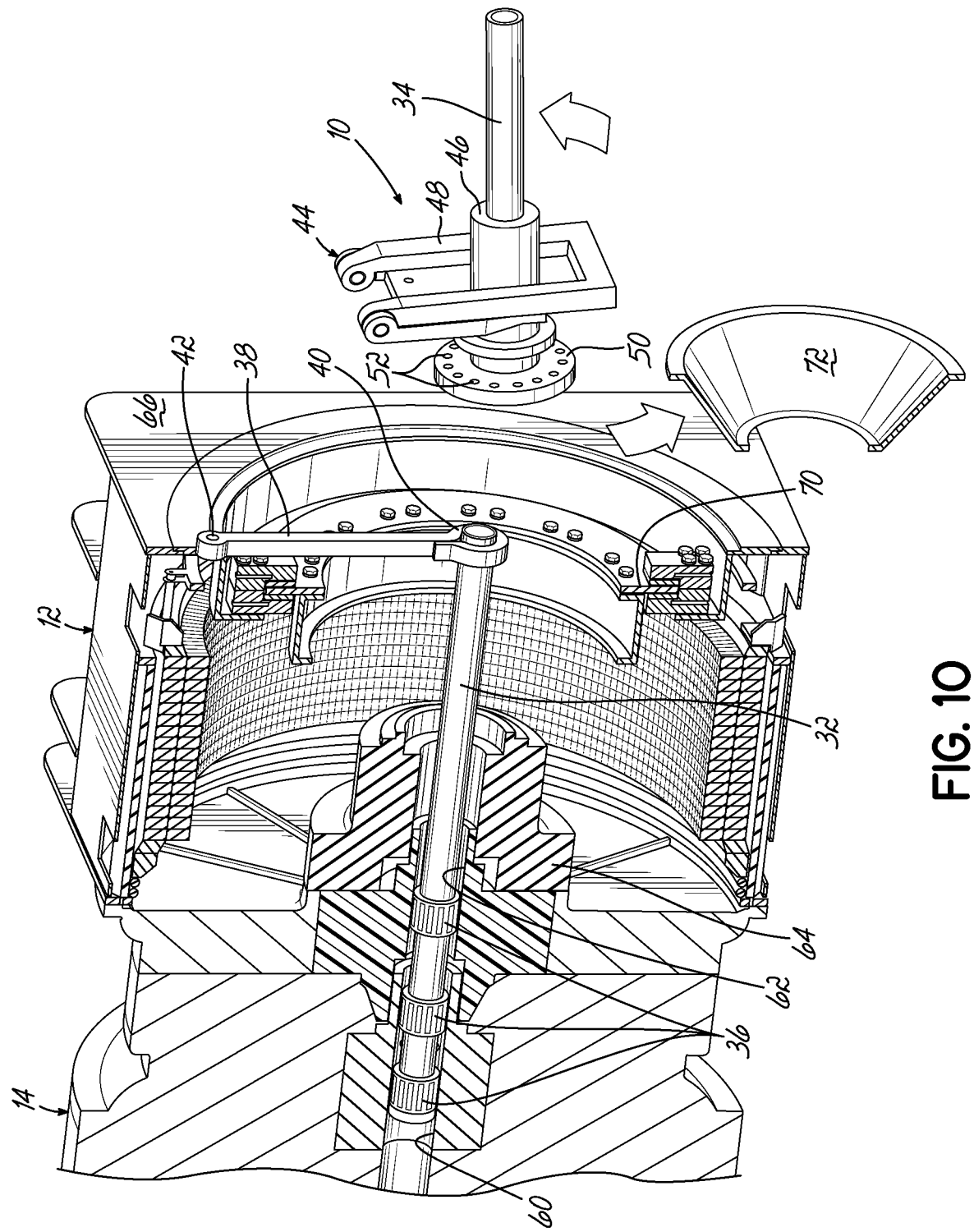
FIG. 10 is a perspective view of the energy generating unit of FIG. 9, with the drive flange disconnected from the sliding tool so that the drive flange can be removed from the nacelle of the wind turbine, in a further step of the disassembly process.

Turning to FIG. 10, the process continues by removing the bolts or other fasteners securing the sliding tool 50 (at apertures 52) to the drive flange 72, thereby releasing the drive flange 72 for movement by the nacelle's crane downwardly through the gap as shown by the arrow in FIG. 10 to a storage location or to the bottom of the tower of the wind turbine. To assist with this movement of the drive flange 72, the frame element 48 of the end support 44 may be folded or pivoted slightly as shown by the rightmost arrow in FIG. 10 to tilt the sliding tool 50 and drive flange 72 downwardly and the opposite end of the proximal tube portion 34 upwardly. In such versions of the process, the frame element 48 can then be returned to the original position following removal of the drive flange 72 from the generator 12 and nacelle.

Figure 11:
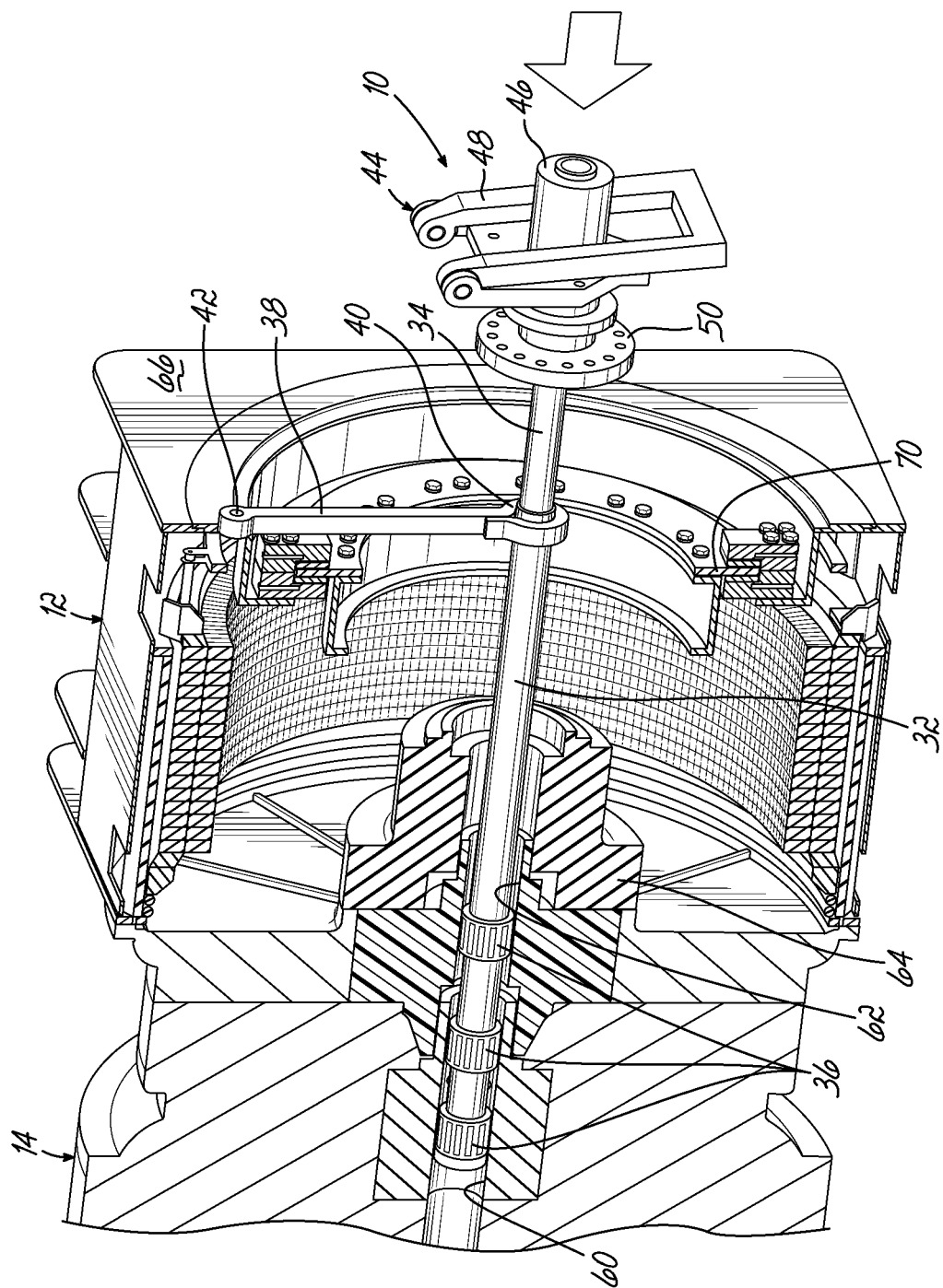
FIG. 11 is a perspective view of the energy generating unit of FIG. 10, with the proximal tube portion moved back through the end support into connection with the distal tube portion to re-assemble the tool chain, in a further step of the disassembly process.
Figure 12:
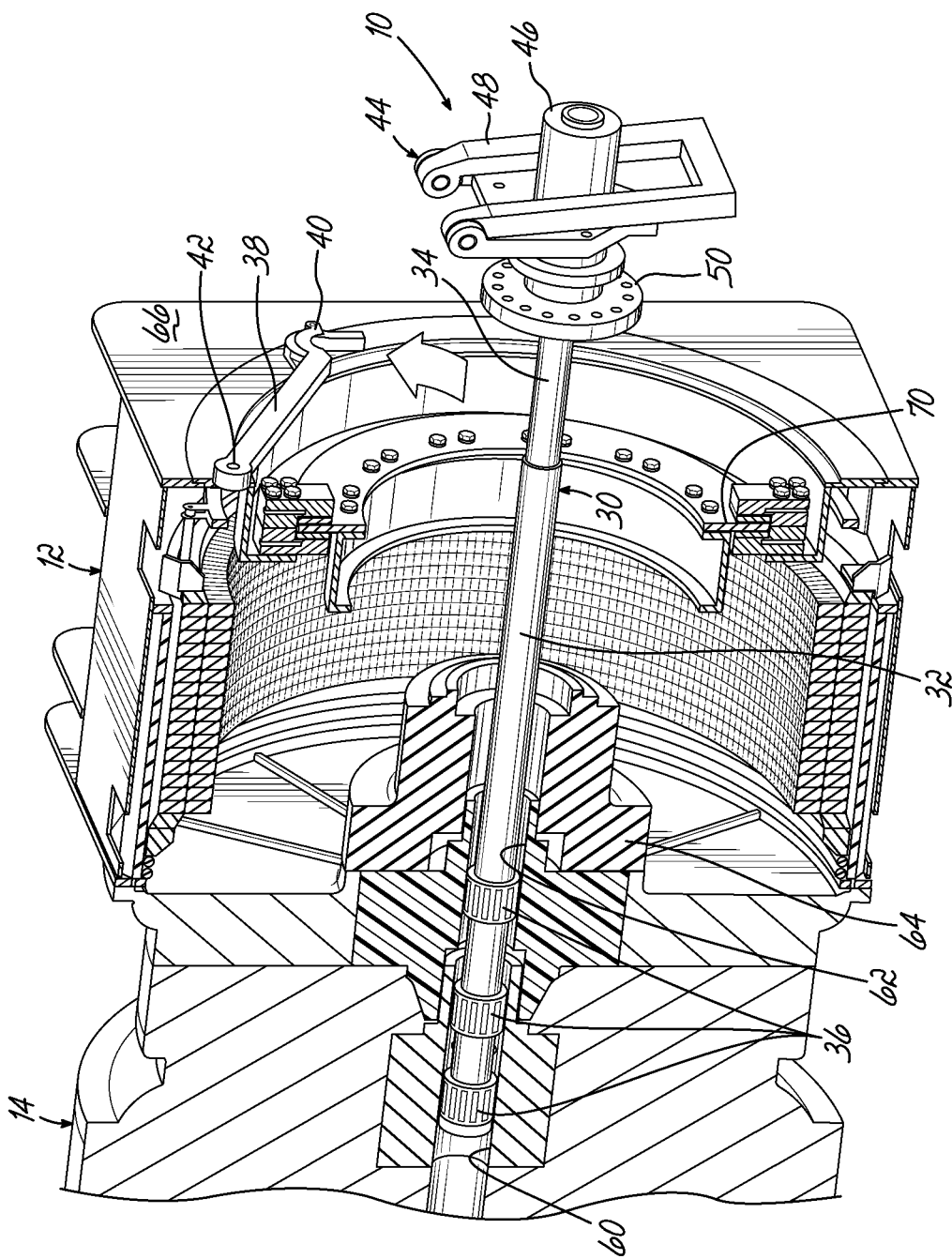
FIG. 12 is a perspective view of the energy generating unit of FIG. 11, with the support arm unhooked from the distal tube portion and pivoted away from the tube of the tool chain, in a further step of the disassembly process.

Also following removal of the drive flange 72, the proximal tube portion 34 is moved in the direction of the arrow in FIG. 11 back towards the distal tube portion 32. The distal and proximal tube portions 32, 34 are then re-engaged using the conical threads, and the hook 40 of the support arm 38 resists any torque applied during engagement of the threads so that the torque does not affect the clamped engagement of the distal tube portion 32 and the first and second output shafts 60, 62. The tool chain 10 is thus assembled again and ready for repeating many of the steps described above to remove additional internal components of the generator 12 and the gearbox 14.

To this end, the process is continued as shown in FIGS. 12 through 17 to remove the bearing cassette 64 from the generator 12. Starting with FIG. 12, the support arm 38 is disengaged from the tube 30 at the hook 40 (using the release mechanism) and pivoted around the swivel joint 42 as shown by the arrow in this Figure out of the path of movement into the generator 12. The sliding tool 50 is then free to move into the interior of the generator 12.

Figure 13:
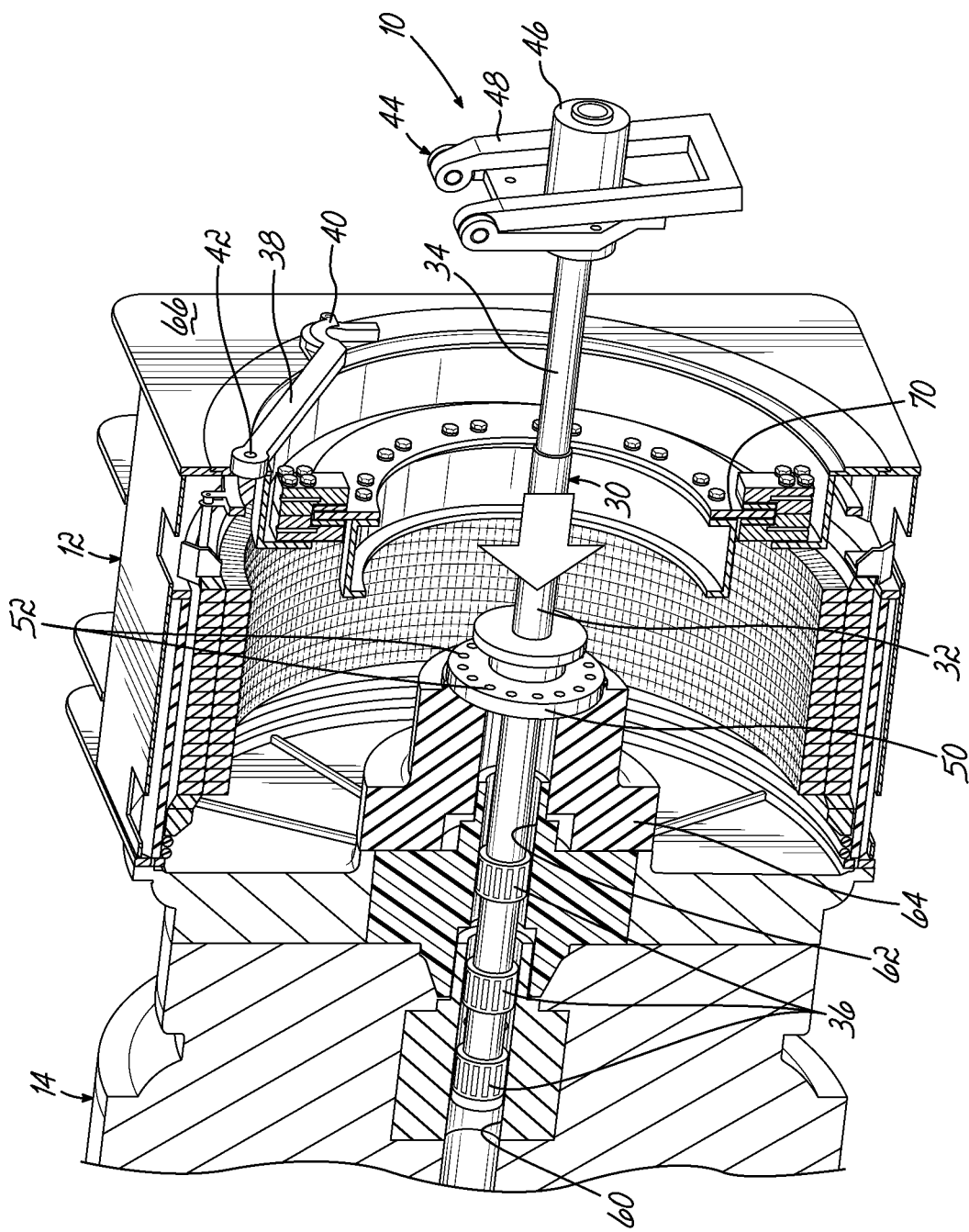
FIG. 13 is a perspective view of the energy generating unit of FIG. 12, with the sliding tool moved along the tube into connection with a bearing cassette of the generator, in a further step of the disassembly process.

Next, the sliding tool 50 slides along the longitudinal length of tube 30 and into engagement with the bearing cassette 64 as shown by the arrow in FIG. 13. Once again, the sliding tool 50 can be secured to the bearing cassette 64 (the component to be removed) using bolts or similar fasteners extending through the apertures 52 of the sliding tool 50. The bearing cassette 64 is also disconnected if necessary from other internal components within the generator 12 and/or gearbox 14 that it interacts with, thereby releasing the bearing cassette 64 for removal by the tool chain 10.

Figure 14:
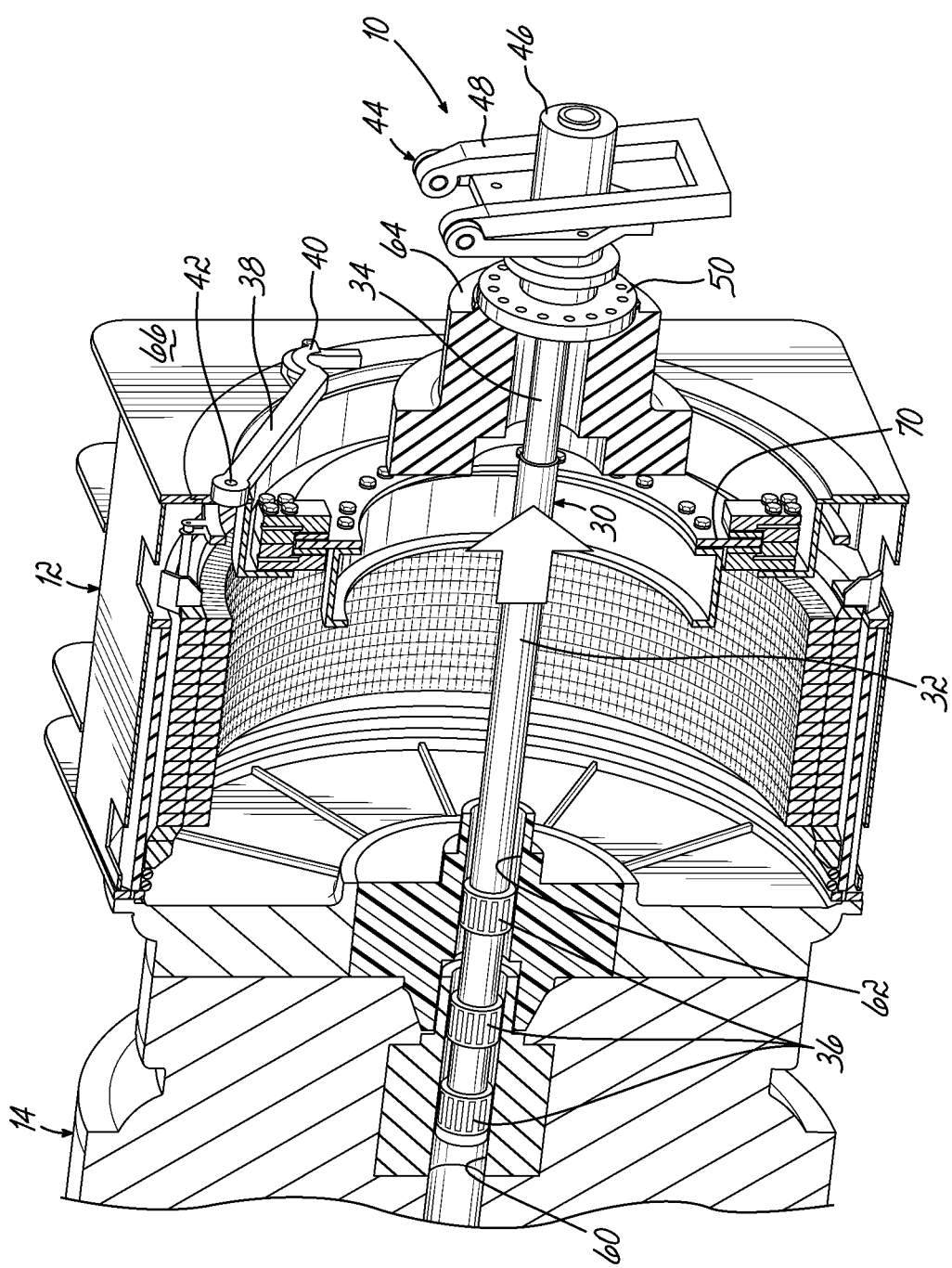
FIG. 14 is a perspective view of the energy generating unit of FIG. 13, with the sliding tool and the bearing cassette pulled away from the generator and next to the end support, in a further step of the disassembly process.

Turning with reference to FIG. 14, the sliding tool 50 then moves along the tube 30 to move the bearing cassette 64 away from the gearbox 14 and out of the generator 12 to a position adjacent the end support 44 (see the arrow in FIG. 14). As noted above, the bearing cassette 64 of the illustrated embodiment is sized to fit through the rotor components and the brake disc 70 of the generator 12, but in alternative designs where the bearing cassette 64 is larger in size, those other internal components may also be removed by the tool chain 10 using similar series of steps as the one described herein for the drive flange 72 and the bearing cassette 64 before removing the bearing cassette 64. In the position shown in FIG. 14, the bearing cassette 64 is ready for removal and replacement and thus may be secured to the nacelle's onboard crane for further movement of this component, such as to the bottom of the tower of the wind turbine.

Figure 15:
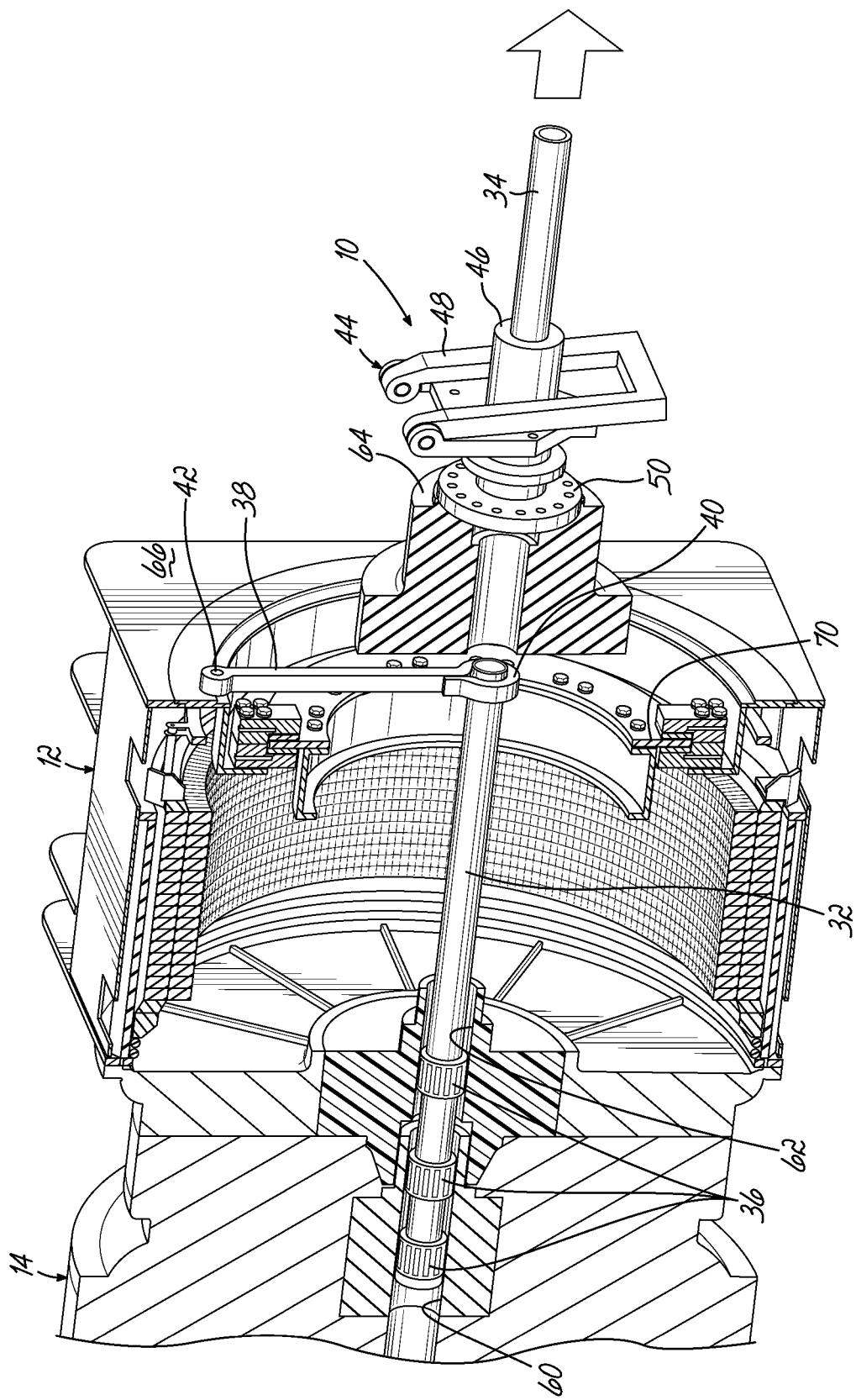
FIG. 15 is a perspective view of the energy generating unit of FIG. 14, with the support arm of the tool chain pivoted back into engagement with the distal tube portion to support the tube, and with the proximal tube portion disconnected from the distal tube portion and moved through the end support to open a gap for release of the bearing cassette, in a further step of the disassembly process.

As shown in FIG. 15, the next steps of the process include pivoting the support arm 38 about the swivel joint 42 back into engagement with the distal tube portion 32 and securing these elements together with the hook 40. The distal and proximal tube portions 32, 34 are then disengaged at the conical threads so that the proximal tube portion 34 can be moved in the direction of the arrow in FIG. 15 to be withdrawn through the tube receptacle 46 at the end support 44. As can be seen from FIG. 15, this opens the gap again between the portions of the tube 30, allowing for movement of the bearing cassette 64 out of the nacelle.

Figure 16:
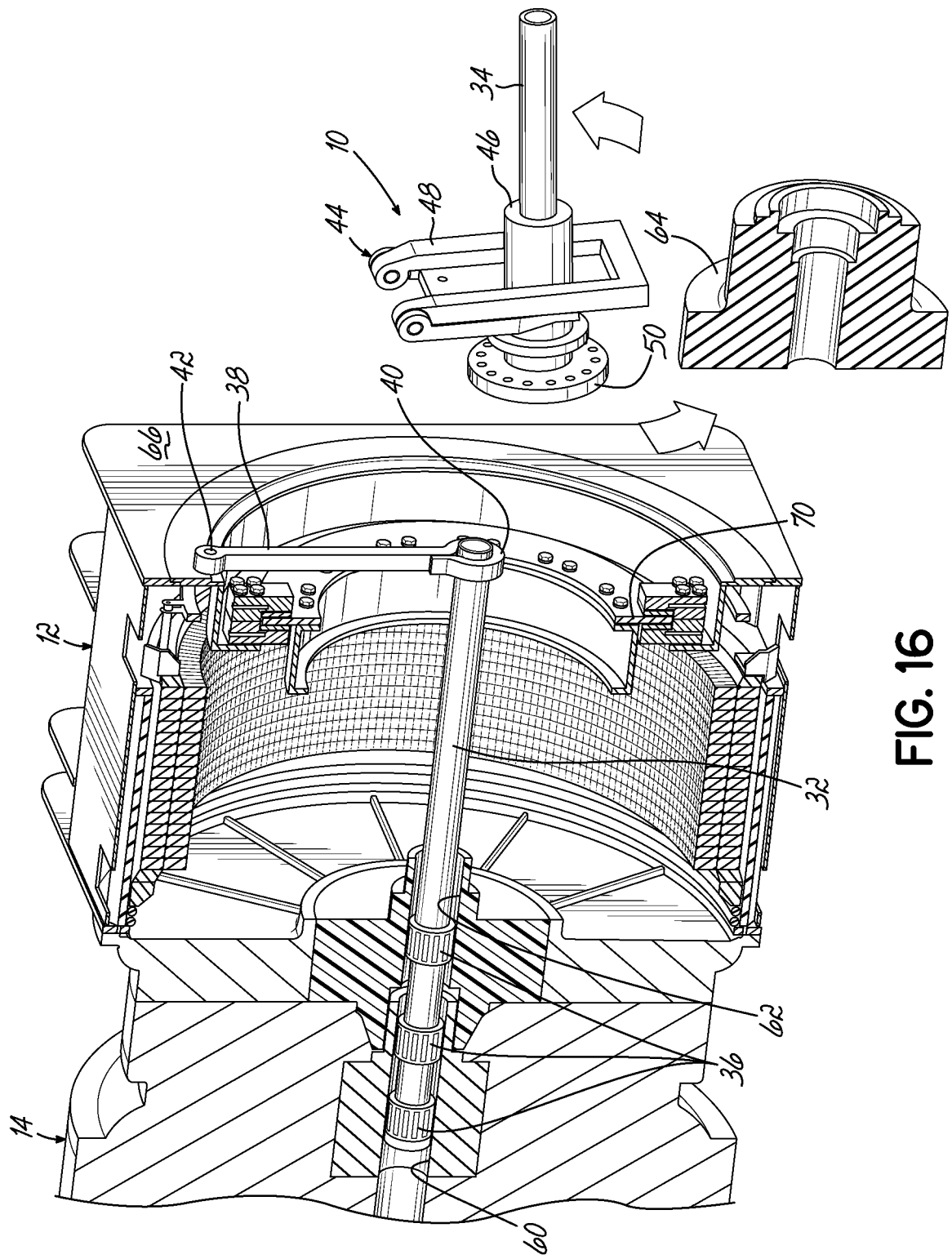
FIG. 16 is a perspective view of the energy generating unit of FIG. 15, with the bearing cassette disconnected from the sliding tool so that the bearing cassette can be removed from the nacelle of the wind turbine, in a further step of the disassembly process.

In FIG. 16, the process continues by removing the bolts or other fasteners securing the sliding tool 50 (at apertures 52) to the bearing cassette 64, thereby releasing the bearing cassette 64 for movement by the nacelle's crane downwardly through the gap as shown by the arrow in FIG. 16 to the bottom of the tower of the wind turbine. To assist with this movement of the bearing cassette 64, the frame element 48 of the end support 44 may be folded or pivoted slightly as shown by the rightmost arrow in FIG. 16 to tilt the sliding tool 50 and bearing cassette 64 downwardly and the opposite end of the proximal tube portion 34 upwardly. The frame element 48 can then be returned to the original position following removal of the bearing cassette 64 from the generator 12 and nacelle.

Figure 17:
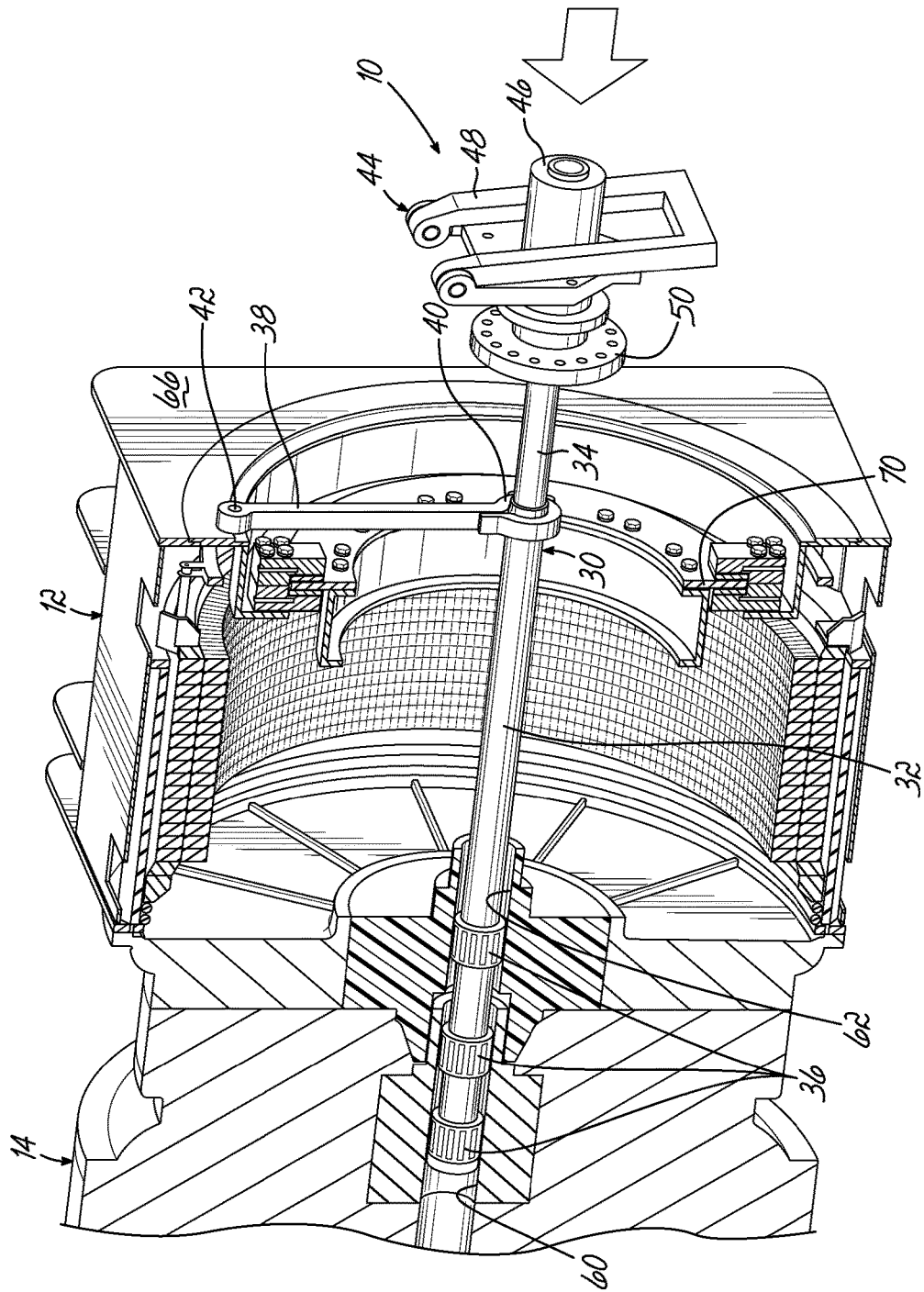
FIG. 17 is a perspective view of the energy generating unit of FIG. 16, with the proximal tube portion moved back through the end support into connection with the distal tube portion to re-assemble the tool chain, in a further step of the disassembly process.

The process continues as shown in FIG. 17 by moving the proximal tube portion 34 in the direction of the arrow in this Figure and back towards the distal tube portion 32. The distal and proximal tube portions 32, 34 are then re-engaged using the conical threads, and the hook 40 of the support arm 38 resists any torque applied during engagement of the threads. The tool chain 10 is thus assembled again and ready for repeating many of the steps described above to remove additional internal components of the generator 12 and the gearbox 14, or completing those steps in reverse to re-assemble the internal components (e.g., to put a new or repaired bearing cassette 64 into the generator 12, for example).

Accordingly, the tool chain 10 and process set forth in the embodiment described above is capable of concentrically fixing internal components of an energy generating unit of a wind turbine in position (such as the first and second output shafts 60, 62 from the gearbox 14) and also removal and replacement of the internal components within the generator 12 and the gearbox 14. Such removal and replacement of internal components may be advantageously conducted without full disassembly of the generator 12 from the gearbox 14, and without necessitating use of large external cranes or the like. The process steps described above can be repeated any number of times to remove any internal component using the sliding tool 50, although it is most likely going to be used to release and replace the bearing cassette 64 in view of the typically shorter lifespan in operation of this component compared to other components of the wind turbine. The tool chain 10 and associated process of this invention therefore improve the maintenance and repair of modern designs of energy generating units contained within nacelles of wind turbines, making such more cost-efficient and easy to implement. As such, wind turbine downtime can be minimized for such maintenance, which is desirable to wind turbine operators.

Further uses of the tool chain 10 according to this invention are also possible. For example, the tool chain 10 can be used to concentrically fix and remove/replace components of the gearbox 14 in alternative circumstances when the generator 12 has been removed. One such circumstance would be where an oil spill occurs within the generator 12 and necessitates rebuilding of the entire generator 12. In such a circumstance, the generator 12 would typically be disassembled as an entire unit from the gearbox 14 and then moved by an external crane down tower for the rebuilding. If it would be desired to remove the bearing cassette 64 or another internal component from the gearbox 14, the tool chain 10 can be used in a substantially similar fashion as set forth above to concentrically fix the output shafts 60, 62 in position and then remove the bearing cassette 64. It will be understood that this and other uses of the tool chain 10 also provide advantages over the disassembly procedures known in the art of wind turbines.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A tool chain configured to remove internal components from a generator and a gearbox of a wind turbine, the tool chain characterized by:

a tube including a distal tube portion and a proximal tube portion removably coupled to one another, the tube defining a longitudinal length configured to extend through the generator;

at least one clamp element located on the distal tube portion and operable to fix the distal tube portion in position relative to internal components of the generator or the gearbox of the wind turbine; and a sliding tool configured to translate along an exterior of the tube between the proximal tube portion and the at least one clamp element, the sliding tool configured to be removably secured to the internal components of the generator and the gearbox to move the internal components along the exterior of the tube and out of the generator and the gearbox.

2. The tool chain of claim 1, further characterized by:

an end support that is configured to receive and support a portion of the proximal tube portion, the end support being configured for mounting within a nacelle of the wind turbine and outside the generator, wherein the proximal tube portion is moveable relative to the end support when disconnected from the distal tube portion, such that a gap is opened between the generator and the proximal tube portion, the gap providing clearance for removal of internal components secured to the sliding tool.

3. The tool chain of claim 2, further characterized by:

a support arm capable of being coupled to the generator and configured to be removably coupled to the distal tube portion adjacent the removable coupling of the distal tube portion and the proximal tube portion, the support arm supporting the distal tube portion when disconnected from the proximal tube portion and the end support.

4. The tool chain of claim 3, characterized in that the support arm comprises a hook at one end and a swivel joint at an opposite end, the hook being removably coupled to the distal tube portion and the swivel joint being coupled to the generator to enable pivotal movement of the support arm and the hook towards and away from the distal tube portion.

5. The tool chain of claim 4, characterized in that the hook is configured to resist torque forces applied when connecting or disconnecting the distal tube portion and the proximal tube portion.

6. The tool chain of claim 1, characterized in that the distal tube portion and the proximal tube portion include conical threads for removably coupling these elements to one another.

7. The tool chain of claim 1, characterized in that the gearbox includes first and second output shafts for transmitting rotational energy to the generator, and the at least one clamp element includes a plurality of the clamp elements, at least one of which is capable of engaging the first output shaft and at least another one of which is capable of engaging the second output shaft when the plurality of clamp elements fixes the distal tube portion in position relative to the first and second output shafts.

8. The tool chain of claim 7, characterized in that each of the plurality of clamp elements is a concentric expanding clamp element that is capable of expanding radially outwardly into locked, frictional engagement with the first and second output shafts.

9. The tool chain of claim 7, characterized in that the second output shaft is removably coupled to a bearing cassette that is positioned adjacent a connection of the gearbox and the generator, and the plurality of clamp elements are capable of maintaining concentric fixing of the first output shaft in position when the sliding tool is used to remove the bearing cassette from the generator.

10. The tool chain of claim 2, characterized in that the end support further comprises a tube receptacle that receives a portion of the proximal tube portion therethrough and a frame element configured to enable limited pivotal movement of the tube receptacle and the proximal tube portion when the proximal tube portion is disconnected from the distal tube portion.

11. The tool chain of claim 1, characterized in that the sliding tool is a cylindrical flange element including apertures configured to receive bolt fasteners for removable connection to internal components of the generator and the gearbox that are to be removed using the tool chain.

12. A method of disassembling and removing internal components from a generator and a gearbox of a wind turbine for repair or replacement, the method characterized by:
   providing the tool chain of claim 1, the method further characterized by:
   (a) inserting the tool chain through an interior of the generator such that the tube of the tool chain extends from the distal tube portion, which is located within a first output shaft of the gearbox for transmitting rotational energy from the gearbox to the generator, to the proximal tube portion that is configured to extend outside the generator;
   (b) actuating the at least one clamp element located on the distal tube portion to fix the tool chain in position relative to the first output shaft of the gearbox;
   (c) moving the sliding tool of the tool chain along a length of the tube from a position on the proximal tube portion into the interior of the generator;
   (d) coupling the sliding tool to an internal component of the generator or of the gearbox; and
   (e) moving the sliding tool and the internal component coupled to the sliding tool along the tube onto the proximal tube portion, and out of the interior of the generator.

13. The method of claim 12, wherein the proximal tube portion extends through an end support located outside the generator and configured to be mounted within a nacelle of the wind turbine, and the method is further characterized by:
   (f) disconnecting and separating the distal tube portion from the proximal tube portion to open a gap between the generator and the proximal tube portion, the gap providing clearance for removal of the internal component of the generator from the tool chain and from the wind turbine.

14. The method of claim 13, further characterized by:
   (g) uncoupling the sliding tool and the internal component so that the internal component can be removed from the tool chain; and
   (h) reconnecting the distal tube portion and the proximal tube portion to reassemble the tool chain and prepare the tool chain for removal of additional internal components of the generator and the gearbox.

15. The method of claim 14, further characterized by:
   repeating steps (c) through (h) to remove additional internal components of the generator and the gearbox from the wind turbine.

16. The method of claim 12, characterized in that the gearbox also includes a second output shaft for transmitting rotational energy from the first output shaft to the generator, the at least one clamp element includes a plurality of the clamp elements, and step (b) further comprises:
   engaging at least one of the plurality of clamp elements with the first output shaft; and engaging at least one of the plurality of clamp elements with the second output shaft, to thereby fix the distal tube portion in position relative to each of the first and second output shafts.

17. The method of claim 12, characterized in that the at least one clamp element is a concentric expanding clamp element, and actuating the at least one clamp element further comprises expanding the concentric expanding clamp element radially outwardly into locked, frictional engagement with at least the first output shaft.

18. The method of claim 16, characterized in that the second output shaft is removably connected to a bearing cassette that is positioned adjacent a connection of the gearbox and the generator, and the plurality of clamp elements maintains concentric fixing of the first output shaft in position when the sliding tool is used to remove the bearing cassette from the generator.

19. The method of claim 13, characterized in that the end support further comprises a tube receptacle and a frame element that pivotally moves the tube receptacle and the proximal tube portion when the proximal tube portion is disconnected from the distal tube portion, to thereby facilitate removal of the internal component from the tool chain.

20. The method of claim 12, characterized in that the tool chain also comprises a support arm coupled to the generator, and the method is further characterized by:
   removably coupling the support arm to the distal tube portion adjacent the removable coupling of the distal tube portion and the proximal tube portion, such that the support arm supports the distal tube portion when disconnected from the proximal tube portion.

21. The method of claim 20, further characterized by:
   pivoting the support arm about a swivel joint coupled to the generator out of engagement from the distal tube portion and out of a path of movement of the sliding tool when the distal and proximal tube portions are connected to one another.

22. The method of claim 12, characterized in that the distal and proximal tube portions include conical threads for removably connecting and disconnecting these elements.

* * * * *